United States Patent

[11] 3,622,022

| [72] | Inventor | Donald M. Grey<br>Selma, Calif. |
|---|---|---|
| [21] | Appl. No. | 828,867 |
| [22] | Filed | May 29, 1969 |
| [45] | Patented | Nov. 23, 1971 |
| [73] | Assignee | Sperry Rand Corporation<br>New Holland, Pa. |

[54] SPRING BACK BALE LOADER FOR AN AUTOMATIC BALE WAGON
6 Claims, 5 Drawing Figs.

[52] U.S. Cl. ................................................ 214/83.36,
198/7 BL, 214/6 B
[51] Int. Cl. .................................................. B60p 1/36
[50] Field of Search ................................... 214/518-522,
83.26, 83.14, 83.36, 750, 6 B, 42,
143; 198/7 BL; 187/9; 294/62, 63

[56] References Cited
UNITED STATES PATENTS

| 3,400,839 | 9/1968 | Jay et al. ....................... | 214/6 B |
| 3,414,139 | 12/1968 | Strommen ..................... | 214/6 B |
| 3,448,879 | 6/1969 | Van Der Lely ............... | 214/522 |
| 2,597,219 | 5/1952 | Appel ............................ | 214/42 X |

Primary Examiner—Albert J. Makay
Attorneys—Joseph A. Brown, John C. Thompson, James J. Kennedy and George C. Bower ABSTRACT: A bale loader for use on an automatic bale wagon and adapted to pick up bales from the field and lift them onto the wagon, the loader having a normally outwardly biased rear wall which will yield rearwardly as the wall and the bale come into contact during bale loading to absorb shock loads imparted to the moving loader by the stationary bale.

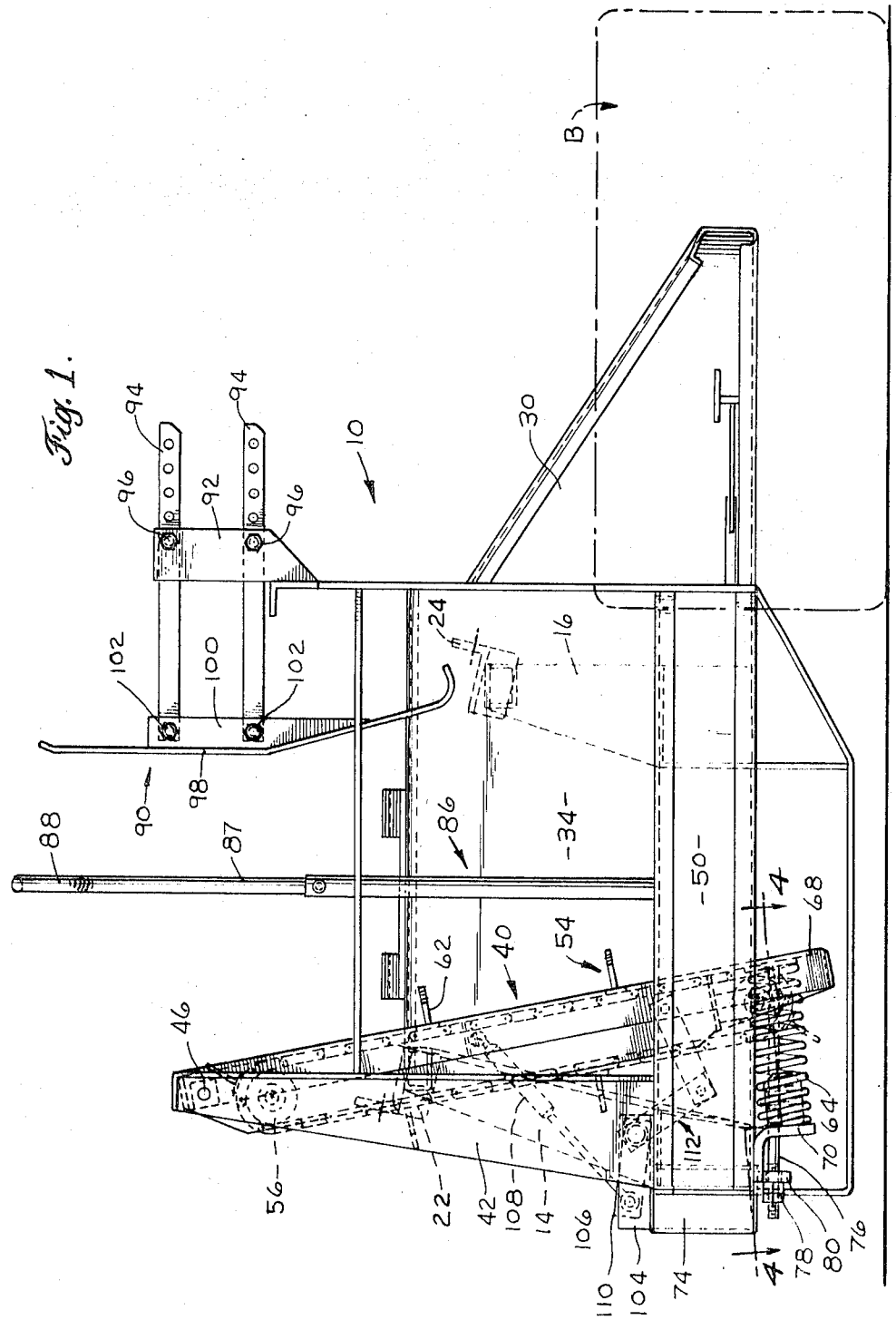

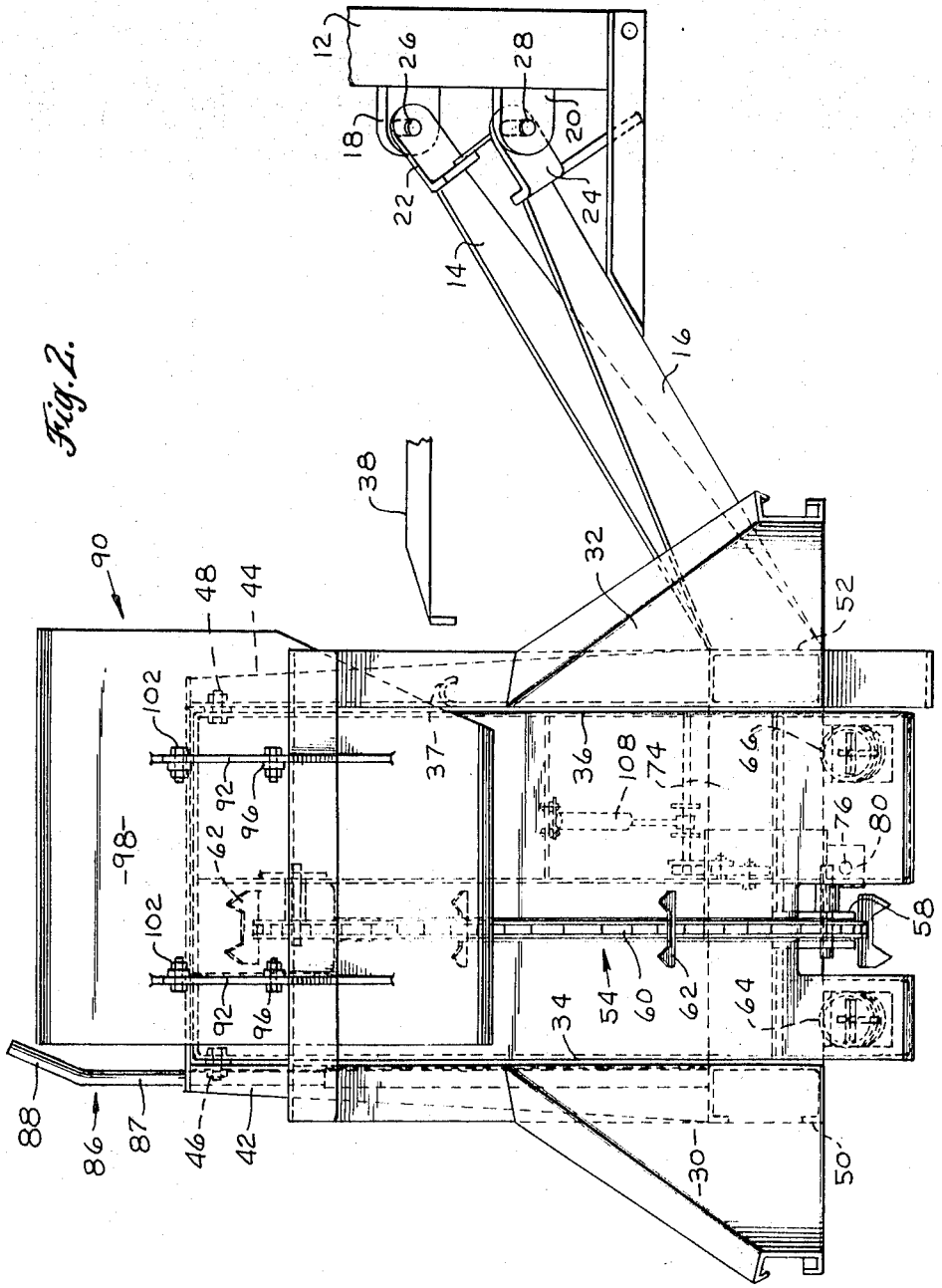

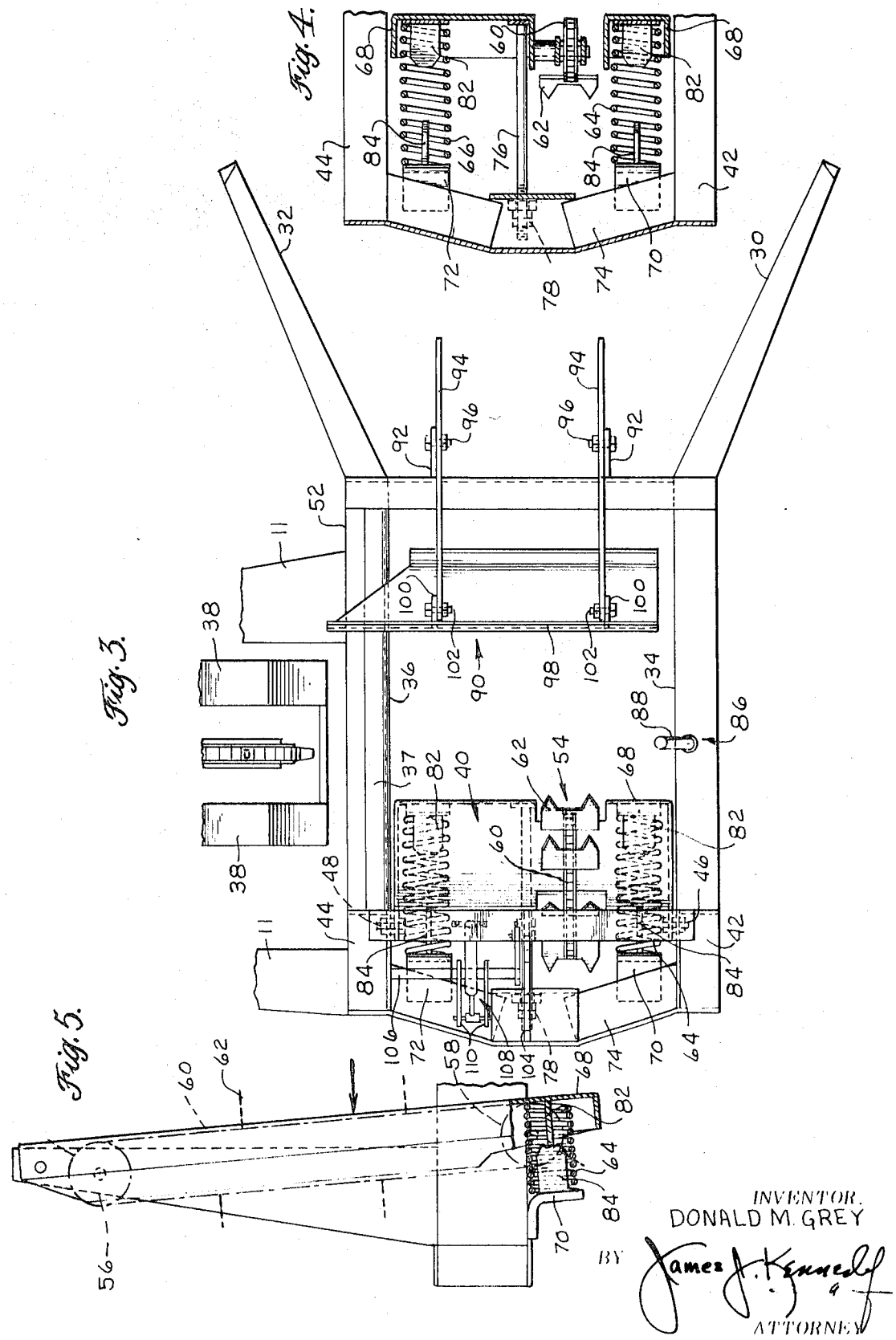

SPRING BACK BALE LOADER FOR AN AUTOMATIC BALE WAGON

BACKGROUND OF THE INVENTION

This invention relates generally to automatic bale wagon apparatus, and specifically to the pickup, or bale loader, apparatus forming an integral operable part of a bale wagon and adapted to lift bales from the ground and deliver them to the wagon as the wagon moves through a field.

Since the introduction of automatic bale-handling wagons, shown and described in U.S. Pat. No. 2,848,127, issued to Grey on Aug. 19, 1958, the wagons have been refined to make them more efficient and effectively operating machines. As a result of the basic Grey wagon and the modifications thereof, automatic bale wagons have gained widespread attention, use and acceptance by farmers inasmuch as they provide a reliable, efficient means of picking up hay bales in a field, loading them onto a wagon, forming a composite stack and discharging the entire stack. An integral part of the bale wagon is the pickup, or bale loader, apparatus which is mounted in an offset relation at the forward end of a wagon and is adapted to guide bales and lift them up from the field onto the wagon. The Grey wagon described in the patent noted above described such a bale-loading device. Another type of bale-loading device has been shown and described in U.S. Pat. 3,367,522, issued to Grey et al. on Feb. 6, 1968. While both of these devices have been very effective in performing their assigned tasks some problems have been experienced over long periods of continued use.

One of the major problems, as those skilled in the art will understand, is the fact that the bale loaders described by the two aforementioned patents are substantially rigid structures which are suspended from the bale wagon and move along with the bale wagon in the field to engage stationary bales and lift the bales onto the wagon. As the wagon moves through the field and approaches the stationary bales, the bales are first contacted by the outwardly diverging guide plates which align the bale for engagement with the bale loader. The forward motion of the loader relative to the bale causes the bale, in effect, to be driven back against the rear wall of the baler where it is engaged by vertically disposed elevator which lifts the rear end of the bale upwardly causing the entire bale to be lifted from the ground up through the bale loader and over onto the receiving table of the bale wagon. It can be readily understood that enormous shock loads are imparted to the bale loader as a result of the contacts with a stationary bale, weighing in excess of 80 pounds, as the wagon moves through the field. It has been found over a prolonged period of use that the carrying structure and the elevator are continually battered and deformed until they are rendered inoperable. At this point the machine must be stopped and the main frame and elevator repaired. By providing some means to absorb these shock loads, the operating life of the bale loader may be substantially increased.

SUMMARY OF THE INVENTION

Accordingly, the principle object of this invention is to provide a bale loader which is capable of absorbing the shock load of bales hitting the loader while the wagon is travelling through a field gathering bales to load on the wagon.

Another object of this invention is to provide a rear wall on the bale loader which is pivotally mounted about its upper edge to the loader frame.

A further object of the invention is to provide a rear wall which is outwardly biased by springs which extend between the loader frame and the rear bottom edge of the rear wall of the loader.

A still further object of the invention is to provide a bale loader rear wall which is normally outwardly biased by spring means, but will yield rearwardly in response to contact of the rear wall with hay bales in a field during the loading operation to absorb shock loads imparted to the bale loader by the stationary bales as the wagon moves through the field.

BRIEF DESCRIPTION OF THE DRAWINGS

FIG. 1 is a side elevational view of a bale loader for a bale wagon having a spring back and constructed in accordance with the invention;

FIG. 2 is a front view of the bale loader shown in FIG. 1;

FIG. 3 is a plan view of the bale loader constructed in accordance with the present invention;

FIG. 4 is a detailed plan section taken along line 4—4 of FIG. 1; and

FIG. 5 is a detailed view showing the spring back in the position it assumes under full shock load.

DESCRIPTION OF THE PREFERRED EMBODIMENT

Referring now to the drawings and specifically to FIGS. 1-3, a bale pickup or loader mechanism indicated generally by the numeral 10, is mounted on a bale wagon frame portion 12 by means of arms 14 and 16. Lugs 18 and 20 are fixed to and extend outwardly from frame member 12 (see FIG. 2). Brackets 22 and 24 are fixed to the outermost ends of arms 14 and 16 and are adapted to be pivotally connected to lugs 18 and 20 by means of pivot pins 26 and 28, respectively. This pivotal connection of the bale loader 10 to the wagon chassis 12 permits the loader to be lifted from a operable position shown in the drawings to an upwardly disposed transport position, not shown.

The bale loader 10 is comprised of a frame structure having a pair of laterally spaced side frame portions 50 and 52, a rearwardly disposed cross frame member 74 and upstanding frame members 42 and 44. The frame structure is generally a U-shaped structure which opens forwardly to receive bales. A pair of outwardly flared panels 30 and 32 are mounted on the frame structure at the forward end thereof and extend outwardly therefrom. Outer and inner sidewalls 34 and 26, respectively, are mounted on the frame structure rearwardly of the diverging panels 30 and 32, while the rear wall is also mounted on a frame structure forwardly of the cross frame 74. The upper portion 37 of the inner sidewall 36 is rolled inwardly toward the bale wagon, as shown in FIG. 2, and forms a bearing edge for bales being lifted by the loader device and being placed on the horizontal spaced-apart bars 38 of the receiving table. The rear wall 40 is pivotally connected to the upstanding frame members 42 and 44 by means of pivot pins 46 and 48, respectively. In this manner, the rear wall is adapted to pivot about its rearwardmost edge on a generally horizontally extending axis. A bale elevator 54, comprising an upper sprocket 56, a lower sprocket 58, an endless conveyor chain 60 and a plurality of spaced lugs 62, is mounted in the rear wall 40 as shown in FIGS. 1, 2 and 3.

A pair of springs 62 and 66 are mounted between the face plate 68 of the rear wall 40 and brackets 70 and 72 fixed to the bale loader frame structure. Specifically, the brackets 70 and 72 are fixed by welding or any other similar means to the cross frame member 74, as shown in FIG. 3. A rod 76 also extends between face plate 68 and cross frame 74, the rear end of the rod extending through a bracket 80 and being adjustably positioned relative thereto by means of nuts 78. Spring retainers 82 and 84, in the form of plate members, are fixed to and extend from the rear portion of faceplate 68 and the forward portions of brackets 70 and 72, respectively, as shown in detail in FIGS. 4 and 5. These retainers extend inwardly toward each other at right angles, as can be seen by the figures.

Fixed to and upstanding from the outer side frame portion 50, is an upstanding deflector rod 86, having a vertical portion 87 and a crooked top portion 88.

An adjustably positionable bale shoe 90 is also mounted on the bale loader frame structure and comprises a pair of upright brackets 92 fixed to the frame structure, a plurality of horizontally straps 94, mounting means 96 for adjustably positioned straps 94 relative to bracket 92, a shoe 98, brackets 100 fixed to the forward portion of the shoe, and mounting means 102 for connecting the straps 94 to bracket 100 of shoe 98.

To further enhance the operation of the bale loader 10, a shock absorber is interposed between the loader frame and the spring back 40. Referring to the drawings, a lug 104 is welded, or otherwise fixed to the cross frame member 74 and extends inwardly therefrom. A shaft 106, horizontally disposed and extending laterally of the loader is pivotally mounted by one end in upstanding bracket 44 and by the other end in lug 104. A shock absorber 108 is pivotally connected by one end to the spring back and by the other to a pair of rearwardly extending, spaced-apart arms 110. The arms 110 are fixed to shaft 106. A linkage 112 is also connected between the shaft 106 and the spring back as shown.

In operation, a bale wagon having a bale loader of the type hereinbefore described mounted thereon proceeds down a field having a plurality of hay bales thereon. The bales are gathered at the forward end of the loader being guided between outwardly flared panels 30 and 32 as the wagon moves forwardly over the ground. The spring biased back 40 engages the bale and pivots rearwardly to compress the springs 64 and 66 and shock absorber 108, thus absorbing the shock loads created by contact of the travelling loader and the static bale on the ground. Upon continued travel of the loader and bale wagon across the field, the bale is upended and elevated by bale elevator 54. As the bale is lifted upwardly by the conveyor chain 60 and associated lug 62, the top of the bale is held against the conveyor chain by shoe 90. Continued upwardly movement of the bale causes the bale to be engaged and deflected by crooked portion 88 of the bale deflector rod 86 so that the bale finally is discharged onto rails 38 of the bale wagon.

While this invention has been described in connection with a single embodiment thereof, it will be understood that this embodiment is capable of modification and that the application is intended to cover any variations, uses, or adaptations following, in general, the principles of the invention and including such departures from the present disclosure as come within the known or customary practice in the art to which the invention pertains, and as fall within the scope of the appended claims or the limits of the appended claims.

Having thus described my invention, what I claim is:

1. A bale loader mounted on an automatic bale-handling wagon for picking up bales from a field and delivering them to said wagon comprising, in combination:
   a forwardly opening frame structure mounted on said wagon;
   a pair of laterally spaced vertical sidewalls mounted on said frame structure;
   a generally vertical rear wall pivotally mounted transversely about an upper portion of said frame structure for outward and inward movement about a fixed horizontally extending axis;
   a pair of diverging deflector panels fixed to and extending forwardly from said sidewalls for guiding bales into said loader;
   a vertically disposed conveyor means on said rear wall for elevating bales relative to said wagon and delivering them thereto; and
   resilient biasing means fixed to and extending between the lower portion of said frame structure and said rear wall, said biasing means normally urging said rear wall outwardly for engagement with oncoming bales as said wagon and loader move through a field, said biasing means being yieldable in response to the engagement of the oncoming bales with said rear wall, allowing the rear wall to pivot inwardly to absorb the shock imparted thereto by the oncoming bales.

2. A bale loader, as recited in claim 1, wherein said frame structure has a vertically extending portion and said rear wall is pivotally connected to said vertical frame portion adjacent the top edge of said wall.

3. A bale loader, as recited in claim 1, wherein means are connected between said frame structure and said rear wall for adjustably limiting the outward reach of said wall by said biasing means.

4. A bale loader, as recited in claim 1, wherein said biasing means comprises a pair of springs and a shock absorber extending between said frame structure and the back side of said rear wall.

5. A bale loader, as recited in claim 4, wherein said springs are fixed to said rear wall adjacent the bottom edge thereof, said springs normally forcing said rear wall outwardly and yielding in response to a rearward force on said rear wall by a bale being engaged by said loader as said wagon moves through a field.

6. A bale loader mounted on an automatic bale-handling wagon for picking up bales from a field and delivering them to said wagon comprising, in combination: a forwardly opening frame structure mounted on said wagon; a pair of laterally spaced vertical sidewalls mounted on said frame structure; a generally vertical rear wall mounted on said frame structure for inward and outward movement about a fixed horizontally extending axis; a pair of diverging deflecting panels fixed to and extending forwardly from said sidewalls for guiding bales into said loader; a vertically disposed conveyor means on said rear wall for elevating bales relative to said wagon and delivering them thereto; and resilient biasing means fixed to and extending between said frame structure and said generally vertical rear wall, said resilient biasing means comprising spring and a shock absorber means disposed so as to normally urge the lower portion of said rear wall outwardly for engagement with oncoming bales and further adapted to yield in response to the engagement of the oncoming bales with said rear wall, thereby allowing said rear wall to pivot inwardly about said horizontal axis to absorb the shock imparted thereto by the oncoming bales.

* * * * *